US006913279B1

(12) United States Patent
Opalka et al.

(10) Patent No.: US 6,913,279 B1
(45) Date of Patent: Jul. 5, 2005

(54) AMBULATORY APPARATUS AND METHOD OF MANUFACTURE THEREOF

(76) Inventors: Susan Opalka, 16625 N. 5th Ave., Phoenix, AZ (US) 85023; Roger Lindholm, 8317 E. Sells Dr., Scottsdale, AZ (US) 85251-2818

( * ) Notice: Subject to any disclaimer, the term of this patent is extended or adjusted under 35 U.S.C. 154(b) by 493 days.

(21) Appl. No.: 09/785,611

(22) Filed: Feb. 16, 2001

Related U.S. Application Data

(60) Provisional application No. 60/183,565, filed on Feb. 18, 2000.

(51) Int. Cl.[7] .................................................. B62B 7/00

(52) U.S. Cl. ..................... 280/642; 260/47.34; 135/65; 135/67; 40/317

(58) Field of Search .............................. 135/65, 66, 67; 280/47.34, 87.021, 87.041, 642, 644; 40/317, 40/660, 737

(56) References Cited

U.S. PATENT DOCUMENTS

| | | | | | |
|---|---|---|---|---|---|
| 4,062,371 | A | * | 12/1977 | Bolen | 135/66 |
| 4,625,742 | A | * | 12/1986 | Phillips | 135/66 |
| 4,927,015 | A | * | 5/1990 | Jones | 206/315.9 |
| 5,191,995 | A | * | 3/1993 | McDonald | 221/24 |
| 5,339,853 | A | * | 8/1994 | Sokolis et al. | 135/67 |
| 5,351,700 | A | * | 10/1994 | Jones et al. | 135/67 |
| 5,351,704 | A | * | 10/1994 | Hunnicutt et al. | 135/66 |
| 5,588,735 | A | * | 12/1996 | Harada | 362/102 |
| 5,901,891 | A | * | 5/1999 | Douglass | 224/407 |
| 6,318,392 | B1 | * | 11/2001 | Chen | 135/67 |
| 6,463,947 | B1 | * | 10/2002 | Wipperfurth | 135/65 |

* cited by examiner

*Primary Examiner*—Christopher P. Ellis
*Assistant Examiner*—Brian Swenson
(74) *Attorney, Agent, or Firm*—Parsons & Goltry; Robert A. Parsons; Michael W. Goltry

(57) ABSTRACT

Ambulatory apparatus for aiding a user in going on foot comprising a walker including transparent receptacles having opposing upper and lower ends, handled structure supported by the upper ends, feet each carried by one of the lower ends and decorative filling contained by the receptacles between the upper and lower ends.

8 Claims, 3 Drawing Sheets

FIGURE 1
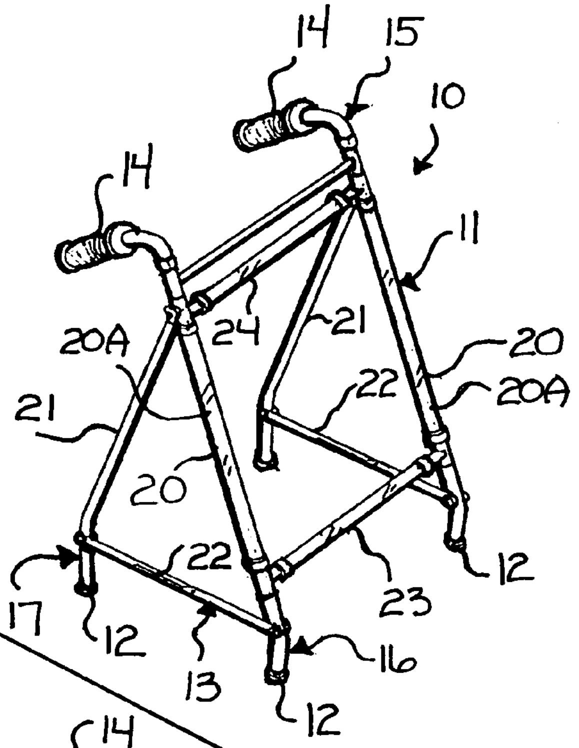
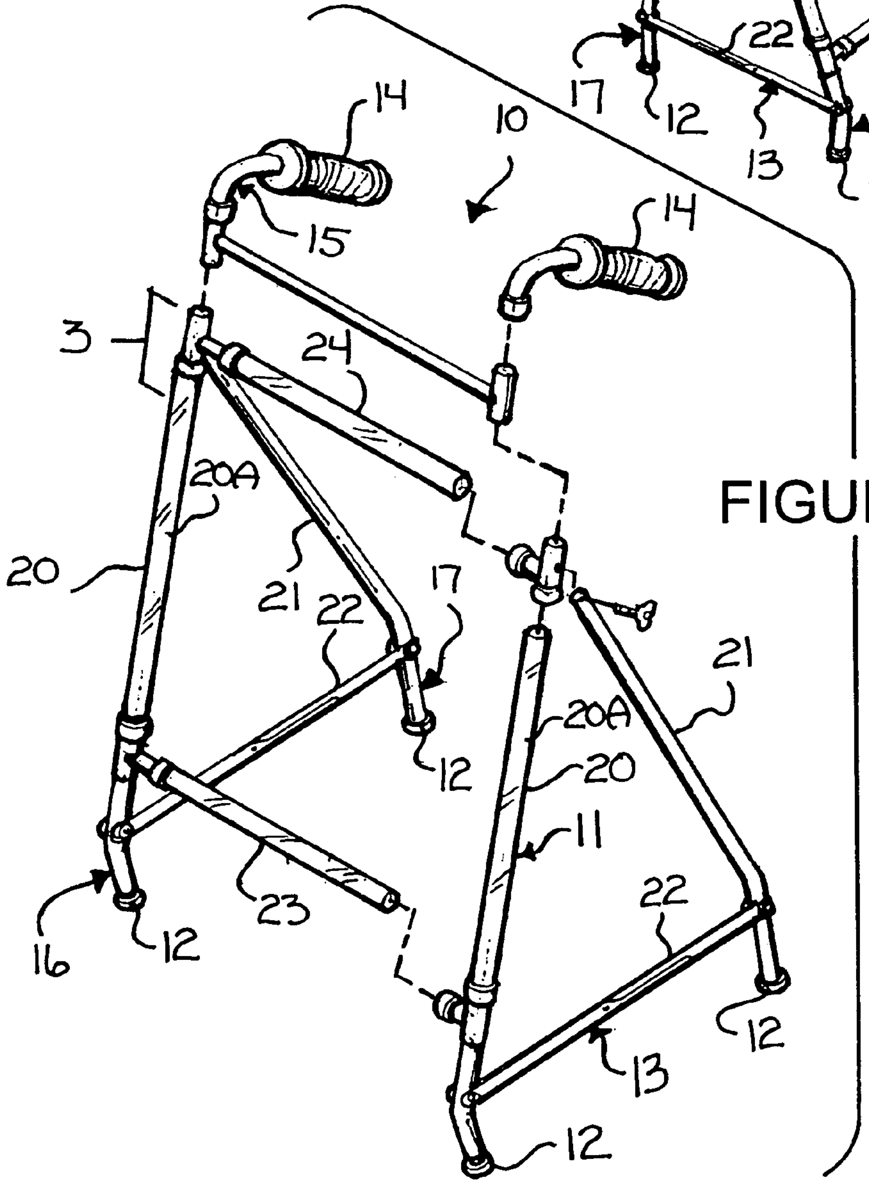
FIGURE 2

AMBULATORY APPARATUS AND METHOD OF MANUFACTURE THEREOF

CROSS-REFERENCE TO RELATED APPLICATIONS

This application claims the benefit of Provisional Application Ser. No. 60/183,565, filed 18 Feb. 2000.

FIELD OF THE INVENTION

This invention concerns apparatus for supporting and assisting physically challenged users for going on foot and associated methods of manufacture.

BACKGROUND OF THE INVENTION

The prior art is replete with ambulatory devices that are designed to support and assist physically challenged users in walking, exercise or otherwise going on foot. Among the vast array of ambulatory devices, walkers and canes remain the most fundamental means of helping people move about their homes and communities and for helping patients move about hospitals and for helping the elderly move about nursing homes and other places. Although walkers and canes are notoriously known, relatively little attention has been directed toward improving not only the construction of walkers and canes but also associated manufacturing methods.

Thus, there is a need for improved ambulatory apparatus for supporting physically challenged users in going on foot having removable and replaceable decorative features and that may be provided in the form of a kit of component parts and decorative features that are capable of being assembled.

SUMMARY OF THE INVENTION

The above problems and others are at least partially solved and the above purposes and others realized in new and improved ambulatory apparatus for aiding a user in going on foot. In an exemplary embodiment, the invention provides ambulatory apparatus, which is comprised of a framework including opposing footed and handled ends and decorative filling held within at least one attached and exposed transparent receptacle. The framework includes pivotally attached forward and rearward legs and the handled end includes at least one handle, which is preferably angled toward the footed end. The filling is loose in the present embodiment, and may comprise one or more of tees, candy, decorative fabric, artificial flowers, golf balls, coins, beads and miniature figurines, etc.

In another embodiment, the invention provides ambulatory apparatus, which is comprised of transparent receptacles having opposing upper and lower ends, handled structure supported by the upper ends, feet each carried by one of the lower ends and decorative filling contained by the receptacles between the upper and lower ends. The handled structure comprises opposing handles, which are angled toward the lower ends. The filling is loose in this embodiment and comprises one or more of tees, candy, decorative fabric, artificial flowers, golf balls, coins, beads and miniature figurines, etc.

In yet another embodiment, the invention provides ambulatory apparatus, which is comprised of a framework having at least one opening or window, opposing footed and handled ends and at least one removably attached decorative element, which is visible through the window. The handled end preferably includes opposing handles, which are angled toward the footed end, which may be wheeled for providing wheeled movement. In this embodiment, the framework includes pivotally attached forward and rearward legs and is equipped with an attached storage bin.

In still another embodiment, the invention proposes a kit of component parts capable of being assembled into a device for aiding a user in going on foot comprising a combination of decorative elements and a framework having windows and opposing footed and handled ends and adapted to removably accommodate each of the decorative elements so that they may be viewed through the windows. In this embodiment, the handled end comprises opposing handles, which are directed toward the footed end, which may be wheeled for providing wheeled movement. A storage bin is also provided, which is adapted to be affixed to the framework.

In a framework of attached forward and rearward hollow legs having upper ends, lower ends, handled structure attached to the upper ends and feet each attached to one of the lower ends, the invention also includes associated methods. An exemplary method comprises steps of providing a decorative element, providing at least one of the forward and rearward legs with a window, positioning the decorative element within the one of the forward and rearward legs, and securing the decorative element to the one of the forward and rearward legs so that the decorative element is capable of being viewed through the window. In accordance with a preferred embodiment, the step of providing a decorative element further includes the step of providing a transparent receptacle containing decorative filling.

BRIEF DESCRIPTION OF THE DRAWINGS

Referring to the drawings:

FIG. 1 is an isometric view of ambulatory apparatus comprising a walker including a framework having feet and handles and decorative features, in accordance with the invention;

FIG. 2 is a partially exploded isometric view of the walker of FIG. 1;

DETAILED DESCRIPTION OF A PREFERRED EMBODIMENT

Figure 3:
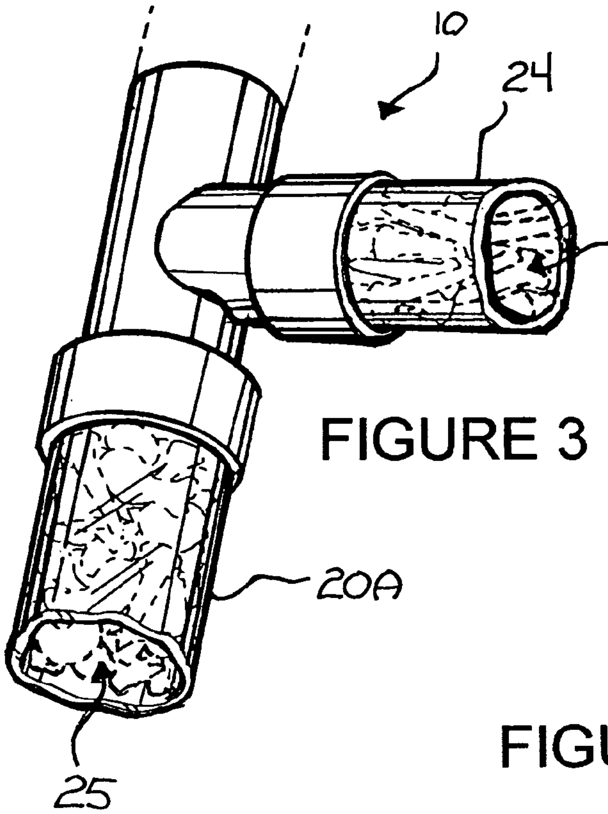
FIG. 3 is an enlarged fragmented view of the framework of FIG. 1.

The present invention provides, among other things, new and improved ambulatory apparatus and, more particularly, improved walkers and canes and associated methods of manufacture and assembly. Ensuing embodiments of the invention are of a type used to support a user in going on foot, such as a young children learning to walk, convalescents and those who suffer lasting affects of injury and physical challenges and the elderly.

Referring to the drawings, FIG. 1 illustrates an isometric view of ambulatory apparatus 10 constructed in accordance with the invention. Apparatus 10 is a walker and is comprised of a framework 11 that supports feet 12 at one end 13 and handles 14 at an opposing end 15. In this embodiment, framework supports four feet 12 and two handles 14, and less or more of each may be employed. Feet 12 engage the ground or supporting surface and are arranged in a substantially box-like, square or rectangular footprint for providing stability to a user, and a substantially triangular footprint may also be employed. Framework 11 defines an upstream end 16 and a downstream end 17. Handles 14 are separated by a distance, reside at approximately the same elevation, are rearwardly directed and are angled downwardly toward end 13. To employ apparatus 10, a user may stand adjacent downstream end 17, grasp handles 14 with his hands and then walk while maneuvering apparatus 10 to provide aid or support during the act of walking. Handles 14 are preferably constructed of a soft, resilient rubber or rubber-like material for providing easy and comfortable gripping. The downward attitude of handles 14 is important as it provides a comfortable and natural angle for gripping and for maneuvering apparatus 10.

With additional reference to FIG. 2, framework 11 is comprised of forward legs 20 and rearward legs 21. Legs 20 and 21 each support one of feet 12. Legs 20 each converge and engage one of legs 21 adjacent end 15. In a preferred embodiment, legs 20 each engage one of legs 21 adjacent end 15 for pivotal movement. This allows framework 11 to be collapsed or folded for storage when not in use. Stretchers 22 each pivotally engage one of legs 20 and one of legs 21 for providing structural support adjacent end 13. Stretchers 22 are spaced apart, define substantially parallel planes and each collapse or pivot at a midpoint thereof for allowing framework 11 to be collapsed or folded. Rails 23 and 24 connect legs 20 together adjacent end 13 and end 15, respectively.

Legs 20 each include a segment 20A. Each segment 20A is considered a receptacle and is tubular and constructed of a clear, substantially rigid material such clear plastic, acrylic, polycarbonate, etc. Each segment 20A resides between ends 13 and 15 and contains and holds filling. FIG. 3 illustrates one segment 20A as it would appear containing filling 25, which may comprise any one or more of golf tees, candy, decorative fabric, artificial flowers, golf balls, coins, beads, miniature figurines, etc. Filling 25 is preferably loose, and yet it may be bound substantially with adhesive. Because each segment 20A is clear, filling 25 can be seen and appreciated by not only the user of apparatus 10 but also onlookers. If desired, the entire length of each leg 21 from end 13 to end 15 or other portions thereof may be constructed of clear, tubular stock filled with a desired filling. One or more of legs 21 and rails 23 and 24 may also be provided with or otherwise constructed of clear, tubular stock filled with a desired filling. The various elements of framework 11 may be assembled with socket, threaded or other suitable mating engagement structure, welding, etc.

Figure 4:
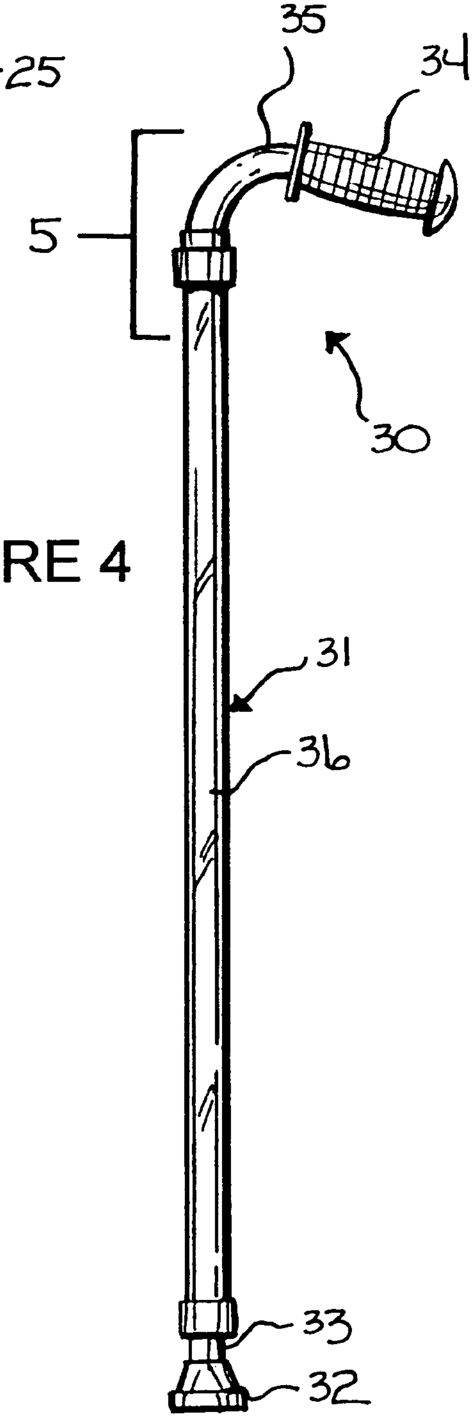
FIG. 4 is a side elevational view of ambulatory apparatus comprising a cane constructed in accordance with another embodiment of the invention.

Turning to FIG. 4, shown is another embodiment of ambulatory apparatus 30 constructed in accordance with the invention. Apparatus 30 is a cane and is comprised of a framework 31 that supports a foot 32 at one end 33 and a handle 34 at an opposing end 35. Foot 32 is designed to engage the ground or supporting surface and handle 34 is angled downwardly toward foot 32. In operation, a user may grasp handle 34 with one of his hands and then walk while maneuvering apparatus 30 to provide aid or support during the act of walking. Handle 34 is preferably constructed of a soft, resilient rubber or rubber-like material for providing easy and comfortable gripping. The downward attitude of handle 34 is important as it provides a very comfortable and natural angle for gripping and for maneuvering apparatus 30.

Figure 5:
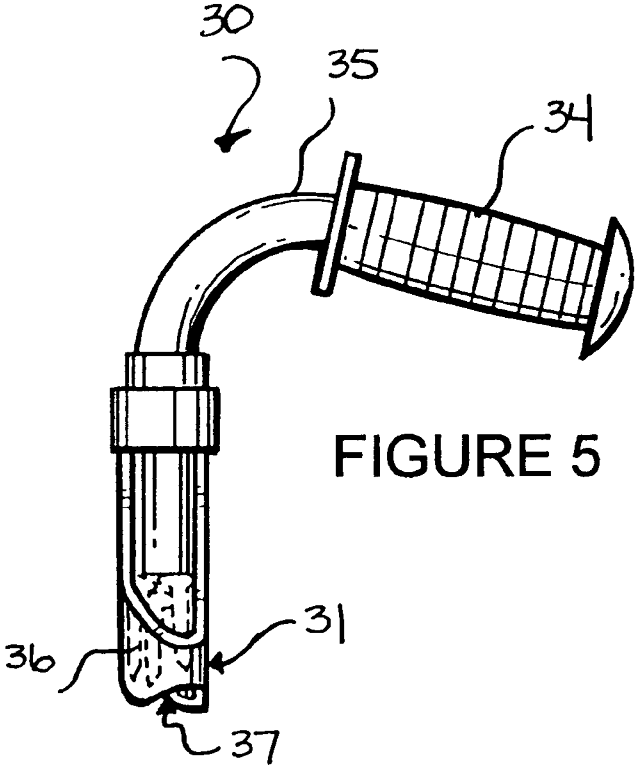
FIG. 5 is a fragmented side elevational view of the cane of FIG. 4.

Framework 31 is elongate and includes a segment 36. Segment 36 is tubular and constructed of a clear, substantially rigid material such clear plastic, acrylic, polycarbonate, etc. Segment 36 resides between ends 33 and 35 and is provided with filling. FIG. 5 illustrates segment 36 as it would appear containing filling 37, which may comprise any one or more of golf tees, candy, decorative fabric, artificial flowers, golf balls, coins, beads, miniature figurines, etc. Because segment 36 is clear, filling 37 can be seen and appreciated by not only the user of apparatus 30 but also onlookers. If desired, the entire length of framework 31 from end 33 to end 35 or other portions thereof may be constructed of clear, tubular stock filled with a desired filling.

Figure 6:
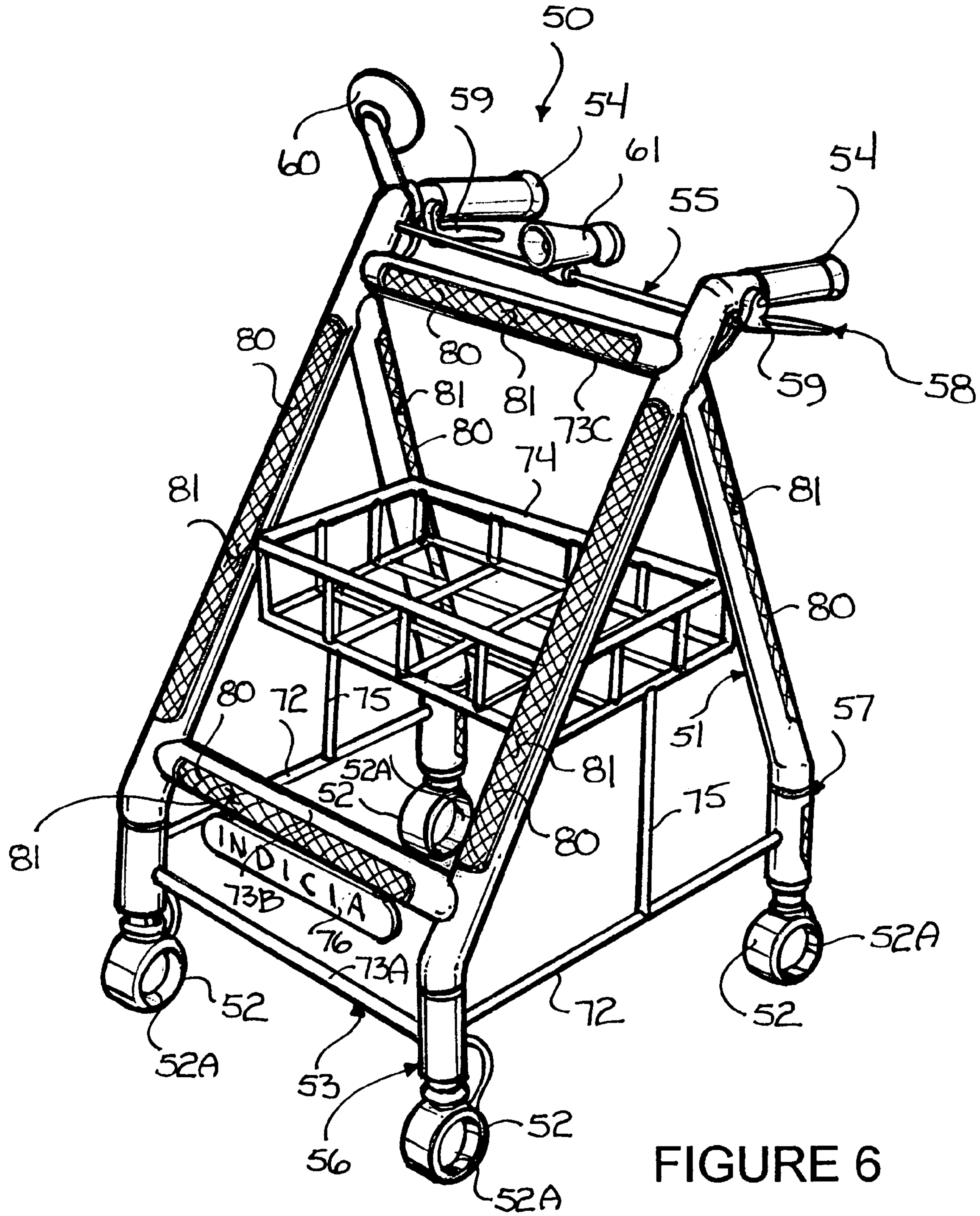
FIG. 6 is an isometric view of another embodiment of a walker including a framework having feet and handles and attached decorative features, in accordance with the invention.

Referring now to FIG. 6, illustrated an isometric view of ambulatory apparatus 50 constructed in accordance with another embodiment of the invention. Apparatus 50 is a walker and is comprised of a framework 51 that supports feet 52 at one end 53 and handles 54 at an opposing end 55. Framework 51 supports four feet 52 and two handles 54, and less or more of each may be employed. In this embodiment, feet 52 are wheels 52A, such as caster wheels, and they engage the ground or supporting surface for wheeled movement and are arranged in substantially box-like, square or rectangular footprint for providing stability to a user, and a substantially triangular footprint may be employed. Feet 52 need not be wheeled, as are feet 12 in the embodiment depicted in FIG. 1, and feet 12 of apparatus 10 may be wheeled if desired, as with apparatus 50. Framework 51 defines an upstream end 56 and a downstream end 57. Handles 54 are separated by a distance, reside at approximately the same elevation, are rearwardly directed and are angled downwardly toward end 53. To employ apparatus 50, a user may stand adjacent downstream end 57, grasp handles 54 with his hands and then walk while maneuvering apparatus 50 to provide aid or support during the act of walking. Handles 54 are preferably constructed of a soft, resilient rubber or rubber-like material for providing easy and comfortable gripping. The downward attitude of handles 54 is important as it provides a; comfortable and natural angle for gripping and for maneuvering apparatus 50. Apparatus 50 is shown equipped with brake apparatus 58 that includes brake handles 59, which are each mounted to framework 51, associated with one of handles 54 and one of two brake mechanisms each operatively associated with one of wheels 52A. By acting on handles 59 and 60, a braking of apparatus 50 is effected at selected ones of wheels 52A. Framework 51 also supports a rearview mirror 60 and a horn 61 at end 55 for convenience of use.

Framework 51 is an assembly of connected parts and is constructed generally of plastic, metal, wood or any combination thereof or other similar material or combination of materials, whether synthetic or natural. Among its various parts, framework 11 includes forward legs 70 and rearward legs 71. Legs 70 and 71 each support one of feet wheels 52A. Legs 70 lead to and engage one of legs 71 adjacent end 55. Stretchers 72 each engage one of legs 20 and one of legs 21 for providing structural support adjacent end 13 and although two are shown, more may be employed. Rails 73A, 73B, 73C connect legs 70 together adjacent ends 53 and 55 as shown and although three are shown, less or more may be provided. Depending from and supported by rail 73A is signage 76 for accommodating sensible or other indicia. Framework 51 also supports a storage bin 74, into which items may be stored or otherwise placed as a matter of convenience during use of apparatus 50 and even nonuse should one so desire. Bin 74 includes opposing attached legs 75, which depend therefrom and attach to stretchers 72, respectively. Bin 74 is also attached to each of legs 70 and legs 71 for added support.

Various means may be employed for connecting together the various described parts of framework including welding, glue, male and female engagement pairs, threaded or socket engagement mechanisms, press or friction fittings and even pivotal and/or sliding couplings for allowing framework 51 to be collapsed for storage during periods of non use. In order to provide this collapse, stretchers 72 each may be constructed and arranged to pivotally connect to legs 70 and 71 and to collapse or pivot at a midpoint thereof.

Framework 51 supports decorative elements 80. Each decorative element 80 is elongate, embodies ornamentation and provides framework 51 with desirable ornamentation when attached thereto. The term "element" as it is used in conjunction with decorative element 80 does not necessarily denote a single object or thing, but may otherwise comprise a number of objects or things that are either connected to one another or mounted in such a way that they cooperate together in a specific fashion toward a desired functional end.

The ornamentation of each decorative element 80 may be expressed with one or more of color, texture, drawings or patterns, carvings, figures or shapes, light reflection, etc. Each decorative element 80 may also be provide as a transparent receptacle containing decorative filling as previously explained in connection with apparatus 10. In this embodiment, legs 70, legs 71 and rails 73B, 73C each support one decorative element 80 and each of them may be equipped with more if desired, and only one of the foregoing or any combination thereof may be provided with one or more decorative ornaments. Other parts of framework 51 may be provided with one or more decorative elements 80 in accordance with this disclosure.

In accordance with a preferred embodiment, legs 70, legs 71 and rails 73B, 73C are hollow or are otherwise constructed of tubular stock and are each therefor considered a receptacle. Legs 70, legs 71 and rails 73B, 73C are each formed or otherwise provided with an opening or window and each is denoted with the reference numeral 81 as a matter of convenience. Windows 81 are each elongate and elongate elements 80 are each positioned within one of legs 70, legs 71 and rails 73B, 73C, and are secured so that decorative elements 80 are each capable of being viewed through its respective window 81 as substantially shown. Decorative elements 80 may be assembled with framework 51 during its construction and they may be attached with one or more biased elements, male and female engagement features, threaded engagement features, glue, welding, press fitting, and they may simply float freely therein.

In another and preferred embodiment, windows 81 are each of a size sufficient for allowing a user to pass decorative elements 81 therethrough and into place in accordance with this disclosure. After inserting a decorative element through a window and into a receptacle (which comprises any one of legs 70, legs 71 and rails 73B, 73C), it is preferred that a user need only act on the decorative element with a twisting, compressive or other force that is suitable for causing it to secure thereto with an engagement assembly supported by the decorative element and its associated receptacle, so that such securement may be relieved by reversing the operation for replacement or repair. The engagement assembly may comprise complemental press fittings or ends, threaded engagement pairs, a complemental male and female engagement or socket engagement pairs, a spring-loaded male and complemental detent engagement mechanism, etc. In this regard, apparatus 50 may be provided as a kit of component parts capable of being assembled into the walker as substantially disclosed, including decorative elements 80 and framework 51 having windows 81 and opposing footed (a footed end is considered wheeled or non-wheeled) and handled ends as substantially disclosed and adapted to removably accommodate each of decorative elements 81 so that they may be viewed through windows 81.

The invention has been described above with reference to one or more preferred embodiments. However, those skilled in the art will recognize that changes and modifications, whether known in the art or novel, may be made to the described embodiments without departing from the nature and scope of the invention, and that operations and engagement and complemental engagement pairs may be reversed. Also, the decorative features of the invention as disclosed in the various embodiments may be incorporated into the construction or assembly of crutches, wheelchairs, and other forms of ambulatory apparatus of a type for aiding a user in going on foot or for otherwise personal ambulatory assistance. Accordingly, any such changes and modifications to one or more of the embodiments herein chosen for purposes of illustration are intended to be included within the scope of the invention as assessed only by a fair interpretation of the ensuing claims.

Having fully described the invention in such clear and concise terms as to enable those skilled in the art to understand and practice the same, the invention claimed is:

What is claimed is:

1. In a framework of attached forward and rearward hollow legs having upper ends, lower ends, handled structure attached to the upper ends and feet each attached to one of the lower ends, a method comprising steps of:

providing a decorative element;

providing at least one of the forward and rearward legs with a window;

positioning the decorative element loosely within the one of the forward and rearward legs; and securing the decorative element to the one of the forward and rearward legs so that the decorative element is capable of being viewed through the window.

2. The method of claim 1, wherein the step of providing a decorative element further includes the step of providing a transparent receptacle containing decorative filling.

3. A kit of component parts capable of being assembled into a device for aiding a user in going on foot comprising a combination of:

decorative elements including transparent tubular segments carrying loose decorative filler; and a framework having windows and opposing footed and handled ends for supporting an individual and aiding the user in going on foot and adapted to removably accommodate each of the decorative elements so that they may be viewed through the windows.

4. The kit of claim 3, wherein the handled end comprises opposing handles, which are directed toward the footed end.

5. The kit of claim 3, wherein the footed end is wheeled.

6. The kit of claim 3, further including a storage bin adapted to be affixed to the framework.

7. Ambulatory apparatus comprising:

a frame work having opposing handle and foot ends for supporting an individual and aiding ambulation thereof;

the framework including at least one tubular segment of transparent material;

at least one separate handle, for grasping by the individual, coupled to and closing the handle end of the framework; and decorative filling loosely carried within the at least one tubular segment.

8. Ambulatory apparatus as claimed in claim 7 wherein the framework further includes:

at least one tubular member having a window therein;

the at least one tubular segment of transparent material carried within the at least one tubular member and visible through the window.

* * * * *